(12) United States Patent
Johnson et al.

(10) Patent No.: US 9,481,281 B2
(45) Date of Patent: Nov. 1, 2016

(54) TRANSPORT ASSEMBLY LOCKING SYSTEM

(71) Applicants: Neil Johnson, Lincoln, NE (US); Jay Ragsdale, Waverly, NE (US)

(72) Inventors: Neil Johnson, Lincoln, NE (US); Jay Ragsdale, Waverly, NE (US)

(73) Assignee: DP Techlink, LLC, Waverly, NE (US)

( * ) Notice: Subject to any disclaimer, the term of this patent is extended or adjusted under 35 U.S.C. 154(b) by 0 days.

(21) Appl. No.: 14/251,406

(22) Filed: Apr. 11, 2014

(65) Prior Publication Data

US 2014/0308104 A1     Oct. 16, 2014

Related U.S. Application Data

(60) Provisional application No. 61/810,863, filed on Apr. 11, 2013.

(51) Int. Cl.

| | |
|---|---|
| *B65G 47/19* | (2006.01) |
| *B65G 47/51* | (2006.01) |
| *B60P 1/40* | (2006.01) |
| *B65G 43/08* | (2006.01) |
| *B65G 65/00* | (2006.01) |

(52) U.S. Cl.
CPC ............. *B60P 1/40* (2013.01); *B65G 43/08* (2013.01); *B65G 47/19* (2013.01); *B65G 47/5195* (2013.01); *B65G 65/005* (2013.01)

(58) Field of Classification Search
CPC . B65G 47/19; B65G 47/5195; B65G 65/005
See application file for complete search history.

(56) References Cited

U.S. PATENT DOCUMENTS

| | | | | |
|---|---|---|---|---|
| 1,341,499 A | * | 5/1920 | De Vol ................. | B23D 61/123 414/303 |
| 3,834,564 A | * | 9/1974 | Laurent ............. | A01D 41/1217 198/535 |
| 4,813,839 A | * | 3/1989 | Compton ............. | B65G 41/002 180/209 |
| 4,832,172 A | * | 5/1989 | Roberto ............. | B65G 47/5195 198/364 |
| 4,992,017 A | * | 2/1991 | Jauregui Carro ...... | B65G 67/24 414/140.5 |
| 5,051,671 A | * | 9/1991 | Crider .................... | B65G 47/19 198/444 |
| 5,575,316 A | * | 11/1996 | Pollklas ............... | A01D 43/073 141/198 |
| 5,749,783 A | * | 5/1998 | Pollklas ............... | A01D 43/073 414/345 |
| 8,126,620 B2 | * | 2/2012 | Ringwald ............ | A01B 69/008 141/192 |
| 8,137,043 B2 | * | 3/2012 | Beck .................... | A01C 15/006 414/414 |
| 2012/0263560 A1 | * | 10/2012 | Diekhans ............. | A01D 43/087 414/294 |
| 2013/0045067 A1 | * | 2/2013 | Pickett ................. | A01B 69/008 414/345 |

\* cited by examiner

*Primary Examiner* — James Keenan
(74) *Attorney, Agent, or Firm* — David H. Milligan PC LLO

(57) ABSTRACT

The present disclosure is directed to a system for controlling dispersal of a granular material from a transport assembly. In an implementation, a system includes a transport assembly including a transport storage receptacle configured to receive granular material, and a payload deposit assembly coupled to transport storage receptacle. The payload assembly configured to disperse the granular material. A location-determining device coupled to the transport assembly. The location-determining device is configured to determine a position of the transport assembly with respect to a storage receptacle. A control mechanism is coupled to the transport storage receptacle, and the control mechanism is configured to control dispersal of the granular material. An electronic device is operatively coupled to the control mechanism. The electronic device is configured to allow dispersal of the granular material from the transport storage receptacle when the transport assembly is correctly positioned with respect to the storage receptacle.

1 Claim, 5 Drawing Sheets

TRANSPORT ASSEMBLY LOCKING SYSTEM

SUMMARY

The present disclosure is directed to a system for controlling dispersal of a granular material from a transport assembly. In an implementation, a system includes a transport assembly including at least one transport storage receptacle configured to receive a granular material, and a payload deposit assembly coupled to the at least one transport storage receptacle. The payload assembly is configured to disperse the granular material. The system also includes a location-determining device coupled to the transport assembly. The location-determining device is configured to determine a position of the transport assembly with respect to a storage receptacle. A control mechanism is coupled to the at least one transport storage receptacle, and the control mechanism is configured to control dispersal of the granular material to the payload deposit assembly. An electronic device is operatively coupled to the control mechanism and communicatively coupled to the location-determining device. The electronic device is configured to cause the control mechanism to allow dispersal of at least a portion the granular material from the at least one transport storage receptacle when the transport assembly is correctly positioned with respect to the storage receptacle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description is described with reference to the accompanying figures. The use of the same reference numbers in different instances in the description and the figures may indicate similar or identical items.

DETAILED DESCRIPTION

Figure 1A:
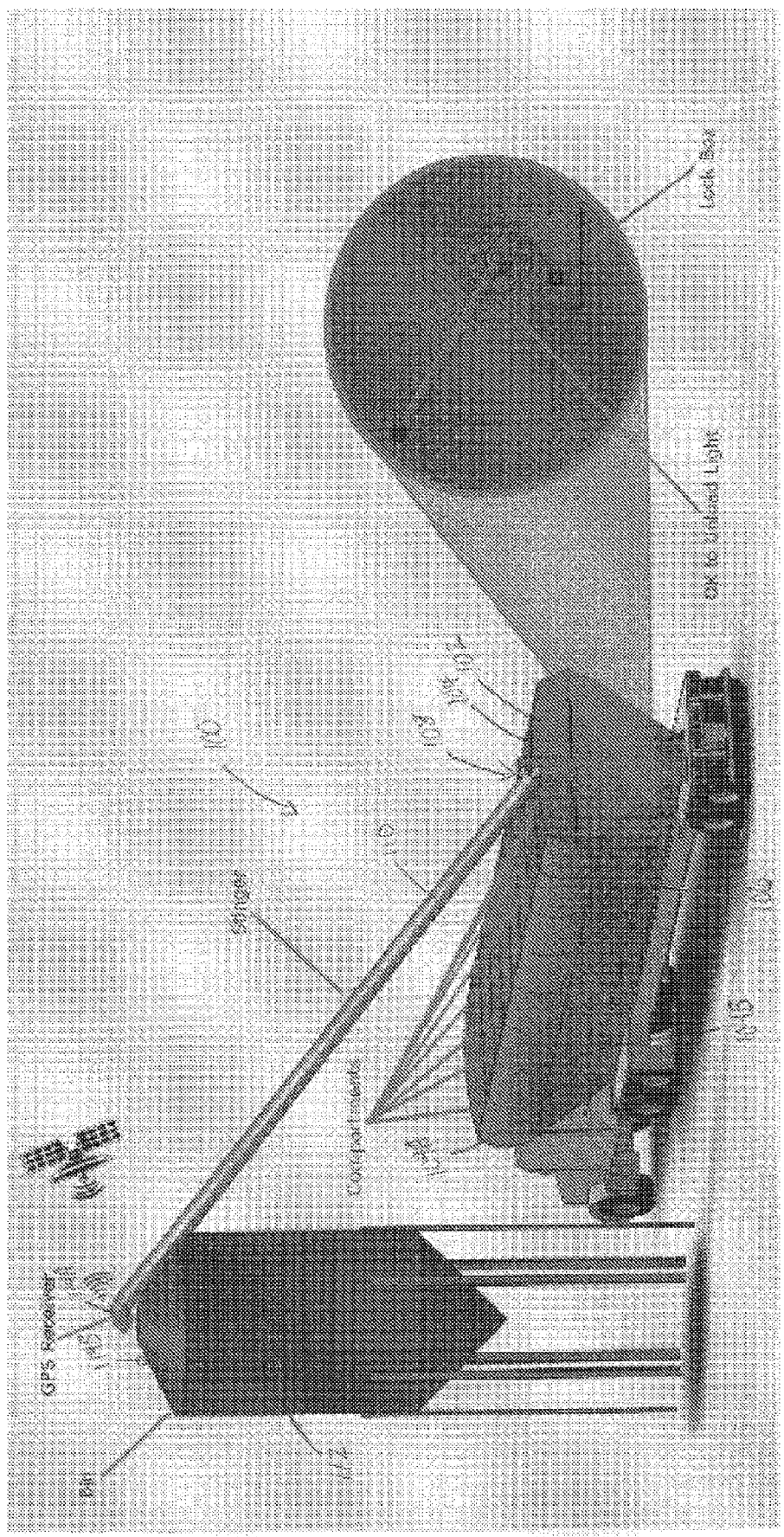
FIGS. 1A through 1C are various perspective views of a system in accordance with an example implementation of the present disclosure, where the system includes a transport assembly including one or more payload release assemblies to prevent unauthorized distribution of a granular material from the transport assembly.
Figure 1B:
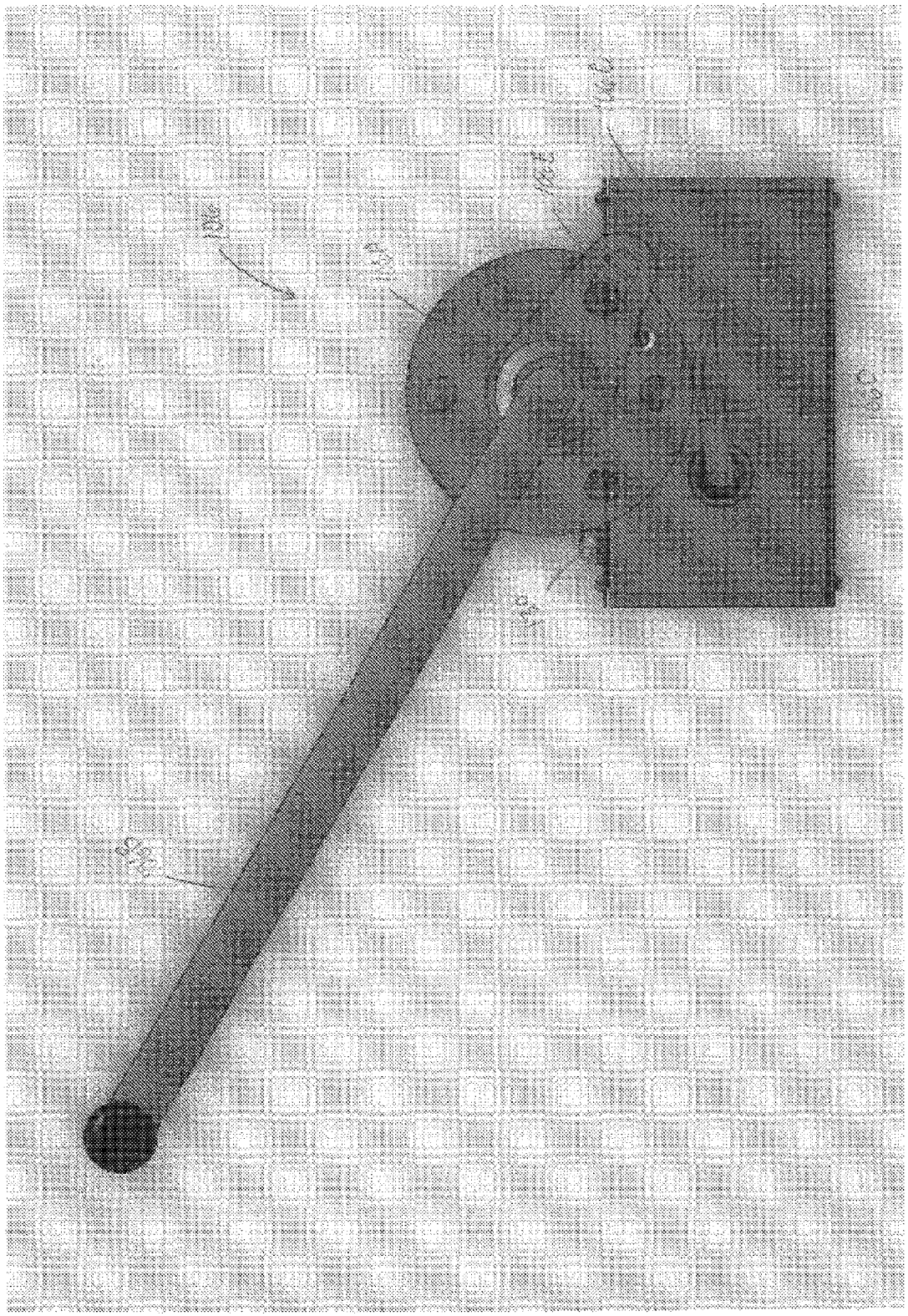
Figure 1C:
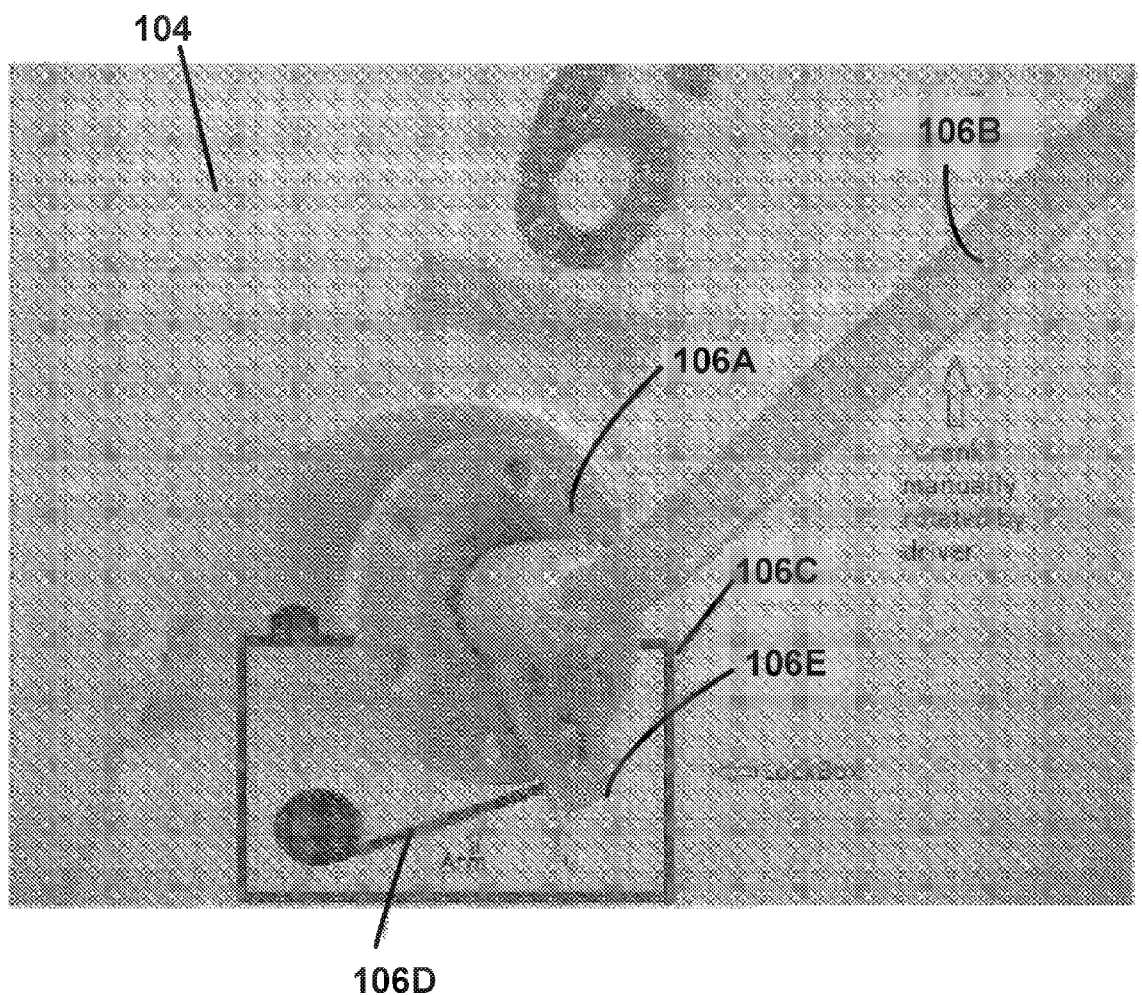

Referring generally to FIGS. 1A through 1D, a system 100 is described in accordance with the present disclosure. As shown, the system 100 includes a transport assembly 102 for holding a payload material (e.g., a granular material, such as grain feed, wheat, or the like). The transport assembly 102 may be a tractor-trailer or the like. The transport assembly 102 includes one or more granular receptacles (e.g., compartments) 104 configured to store a payload material for transport. For example, a first receptacle 104A is configured to store a first type of granular material (e.g., turkey feed), and a second receptacle 104B is configured to store a second type of granular material (e.g., pig feed). As shown in FIG. 1A, the transport assembly 102 includes one or more payload release assemblies 106. Each payload release assembly 106 interfaces with a corresponding granular receptacle 104.

Each payload release assembly 106 (see FIGS. 1B and 1C) is configured to prevent unauthorized distribution of the payload material, which is described in greater detail herein. In one or more implementations, the payload release assembly 106 includes a collar 106A, a crank 106B that interfaces with the collar 106A, a lockbox 106C (e.g., a housing structure) mounted to a corresponding receptacle 104, and a lockbox arm 106D pivotally connected to the lockbox 106C to prevent rotation of the crank 106B during unauthorized periods of distribution. The lockbox arm 106D is configured to transition, or pivot, between a first position and a second position. For example, the lockbox arm 106D is configured to interface with a flange 106E that is coupled to the crank 106B when the lockbox arm 106D is in the first position to prevent rotation of the crank 106B. In one or more implementations, the crank 106B and the flange 106E are configured to rotate during authorized periods of distribution, which results in the distribution of the payload material (e.g., granular material) from the corresponding receptacle 104.

The transport assembly 102 also includes a payload deposit assembly 108 that is configured to deposit the granular material into a storage receptacle 112 (e.g., a feed bin). In one or more implementations, the payload deposit assembly 108 comprises a stinger arm 110 (e.g., an auger assembly to offload a selected payload material). The storage receptacle 112 may be utilized to store the granular material and/or to provide the granular material to livestock.

As shown in FIG. 1A, the payload deposit assembly 108 and the storage receptacle 112 may include a one or more location-determining devices (e.g., location-determining devices 114A, 114B). In one or more implementations, the location-determining device 114A comprises a global-positioning system receiver. In another implementation, the location determining devices may comprise radio-frequency identification devices 114A, 114B, or the like. The location-determining device 114A may be positioned on the stinger arm 110 in some embodiments, and the location-determining device 114B may be positioned on an outside surface of the storage receptacle 112 in some embodiments. In an implementation, the location-determining devices 114A is configured to receive navigational signals (e.g., coordinates) from GPS satellites and to calculate a location (e.g., latitude/longitude coordinates) of the location-determining device 114A as a function of the signals. The location-determining devices 114A are utilized to ensure the payload deposit assembly 108 is positioned proximate to the correct storage receptacle 112 (e.g., position of the storage receptacle is already stored in memory). In another implementation, the location of the payload deposit assembly 108 may be determined by the use of radio-frequency identification devices. For example, when the stinger arm 110 (and includes a radio-frequency identification device) is within a pre-defined proximity of a storage receptacle, which includes another radio-frequency identification device 114B, the respective radio-frequency identification devices 114A, 114B may communicate with one another to indicate the payload deposit assembly 108 is positioned over the correct storage receptacle. It is understood that in some implementations that only the payload deposit assembly 108 includes a location-determining device 114 (e.g., in the GPS configuration).

Figure 1D:
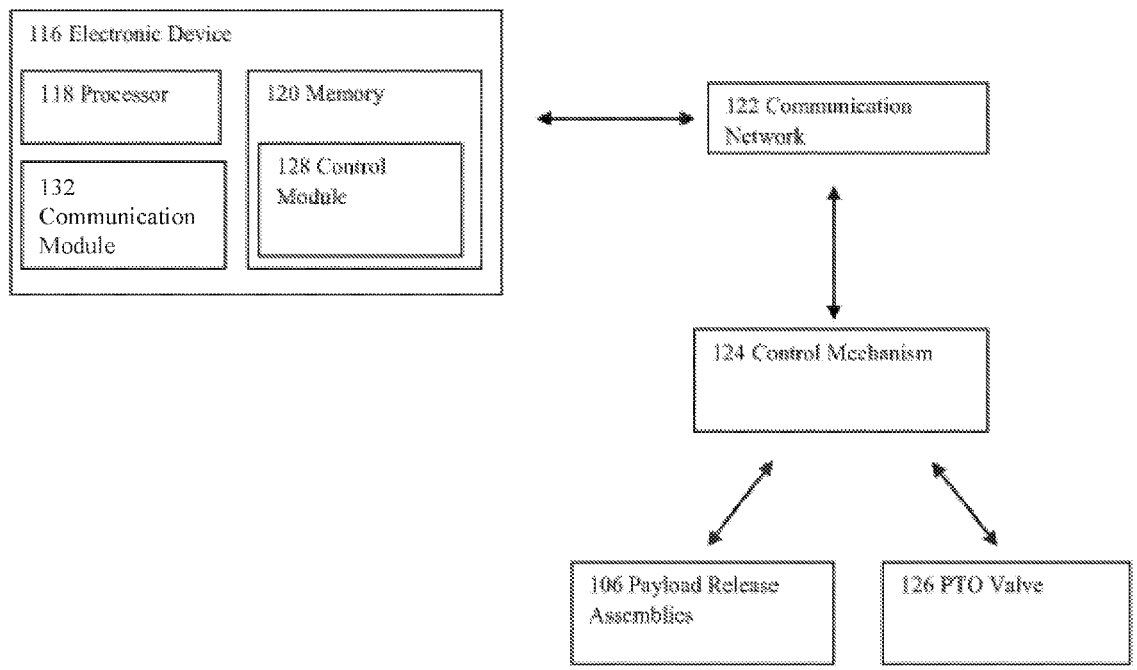
FIG. 1D is a block diagram of an electronic device configured to operate the one or more payload release assemblies in accordance with an example implementation of the present disclosure.

As shown in FIG. 1D, the system 100 includes an electronic device 116 that is configured to communicatively couple to the location-determining devices 114A, 114B. The electronic device 116 includes a processor 118 and a memory 120. The processor 118 provides processing functionality for the electronic device 116 and may include any number of processors, micro-controllers, or other processing systems and resident or external memory for storing data and other information accessed or generated by the device 116. The processor 118 may execute one or more software programs (e.g., modules) that implement techniques described herein.

The memory 120 is an example of tangible computer-readable media that provides storage functionality to store various data associated with the operation of the electronic device 116, such as the software program and code segments mentioned above, or other data to instruct the processor 118 and other elements of the electronic device 116 to perform the steps described herein. Although a single memory 120 is shown, a wide variety of types and combinations of memory may be employed. The memory 120 may be integral with the processor 118, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the device 116, the memory 120 may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The electronic device 116 is communicatively coupled to the location-determining devices 114A, 114B over a communication network 122 through a communication module 132 included in the device 116. The communication module 132 may be representative of a variety of communication components and functionality, including, but not limited to: one or more antennas; a browser; a transmitter and/or receiver; a wireless radio; data ports; software interfaces and drivers; networking interfaces; data processing components; and so forth. For example, the communication module 132 may represent radio frequency (RF) circuitry configured to receive and/or transmit electromagnetic signals. The RF circuitry is also configured to convert electrical signals to/from electromagnetic signals and communicates with the communications network 120 and other communications devices via the electromagnetic signals. RF circuitry may include, but is not limited to: an antenna system, an RF transceiver, one or more amplifiers, a tuner, one or more oscillators, a digital signal processor, a CODEC chipset, a subscriber identity module (SIM) card, memory, and so forth.

The communication module 132 facilitates communication with other devices (e.g., the location-determining devices 114A, 114B) through the communication network 122, external ports (e.g., Universal Serial Bus (USB), a FIREWIRE communication interface, etc.) included in the electronic device 116, or the like. The external ports are adapted for communicatively coupling the device 116 directly to other devices or indirectly over the communication network 122. In some embodiments, the external port is a multi-pin connector, or the like.

The communication network 122 may comprise a variety of different types of networks and connections that are contemplated, including, but not limited to: the Internet; an intranet; a satellite network; a cellular network; a mobile data network; wired and/or wireless connections; and so forth.

Wireless networks may comprise any of a plurality of communications standards, protocols and technologies, including but not limited to: Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11 g and/or IEEE 802.11n), voice over Internet Protocol (VoIP), WiMAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS), and/or Short Message Service (SMS), or any other suitable communication protocol (i.e., a proprietary communication protocol/network).

As shown in FIGS. 1A through 1D, the electronic device 116 is operatively coupled to a control mechanism 124 that is mounted to the transport assembly 102. In some examples, the electronic device 116 may be a mobile electronic device (e.g., a smartphone device, a tablet computing device, etc.) or a computing device that may be integrated within a cab of vehicle configured to couple to the transport assembly 102. The control mechanism 124 is also operatively coupled to each payload release assembly 106. For example, during operation, the electronic device 116 is configured to transmit a signal to the control mechanism 124 when the transport assembly 102 is properly positioned (e.g., positioned at the correct storage receptacle 112 for dispersal of a granular material. Upon receiving the signal, the control mechanism 124 is configured to cause a corresponding payload release assembly 106 to transition the lockbox arm 106D from the first position to the second position, which allows an operator to manually translate the crank 106B to cause release of a portion of a granular material. Additionally, the control mechanism 124 may be operatively coupled to a power-take off (PTO) valve 126. In one or more implementations, the PTO valve 126 is configured to operate the stinger arm 110. For example, the PTO valve 126 controls hydraulic operation of the stinger arm 110. In some instances of the present disclosure, when the transport assembly 102 is not positioned proximate to the proper storage receptacle 112, the control mechanism 124 is configured to prevent hydraulic operation of the stinger arm 110.

The electronic device 116 includes a control module 128 that is storable in the memory 120 and executable by the processor 118. The control module 128 is representative of functionality to control the payload release assembly 106 based upon the position of the payload deposit assembly 108 with respect to a storage receptacle 112. For example, the control module 128 is configured to cause the electronic device 116 to interface with the location-determining devices 114A, 114B. During operation, an operator of the transport assembly 102 positions the payload deposit assembly 108 to allow for dispersion of the payload from a storage receptacle 104 to a corresponding storage receptacle 112. The control module 128 is configured to ensure that the transport assembly 102 (i.e., location-determining device 114A) is positioned proximate to the correct storage receptacle 112 (e.g., the payload deposit assembly 108 is positioned over the correct storage receptacle 112). In an implementation, the control module 128 receives signals representing location data of the payload release assembly 106 and a storage receptacle 112.

The control module 128 is configured to cross-reference the location data to ensure proper positioning of the transport assembly 102. For instance, the module 128 may access pre-defined instructions (e.g., operational parameters) stored in the memory 120 indicating which type of granular material, or feed, (e.g., which feed from what storage receptacle 102) is to be offloaded into what storage receptacle 112. For example, the instructions may include, but are not limited to: what type of granular material is stored in each storage receptacle 104, where the granular material for each storage receptacle is to be dispersed (e.g., which storage receptacle 112 is to receive which granular material), and so forth. When the location-determining device 114A is properly positioned, the module 128 is configured to cause transmission of a signal to the control mechanism 124. As described above, in response to the signal, the control mechanism 124 is configured to operate a corresponding payload release assembly 106 and/or the PTO valve to allow positioning of the payload deposit assembly 108.

Figure 2:
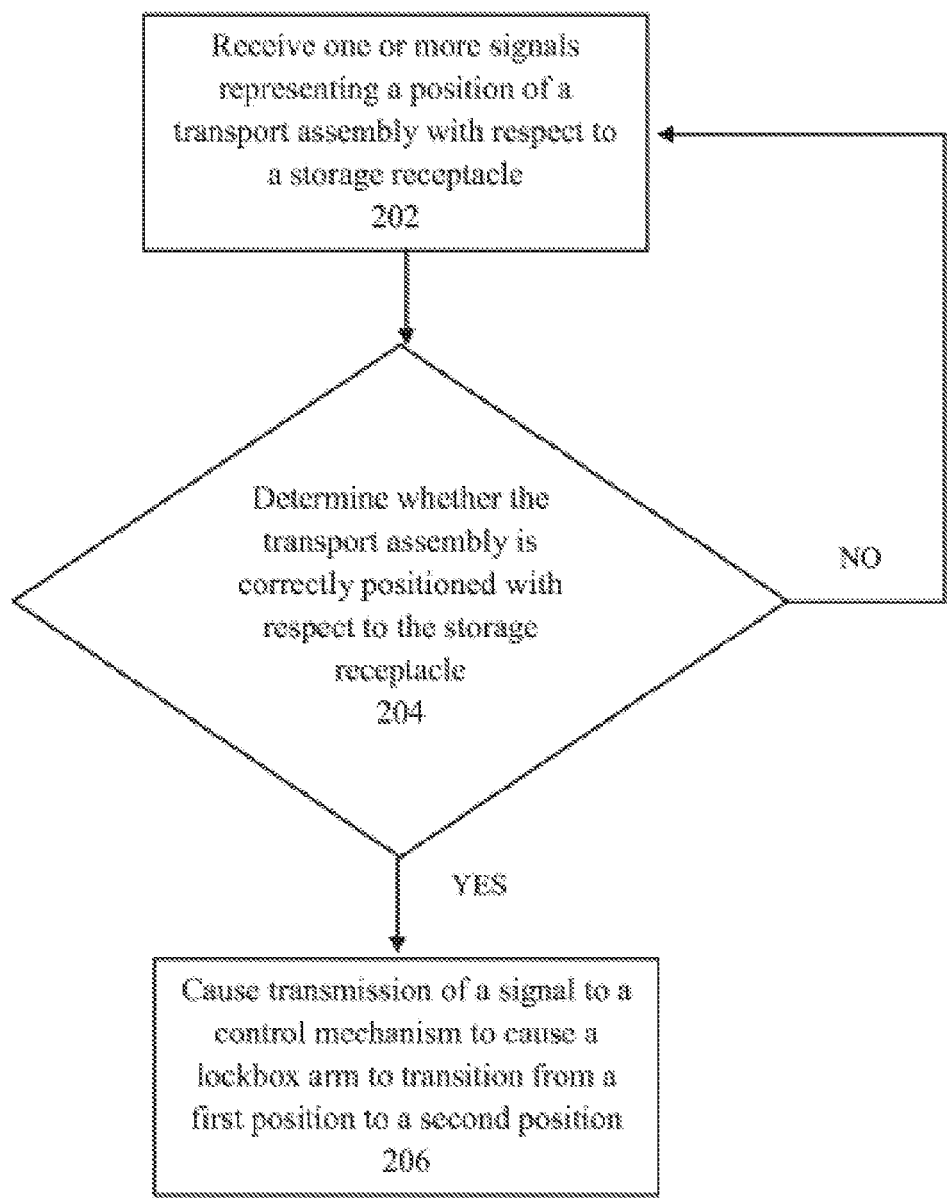
FIG. 2 is a flow diagram illustrating an example method for preventing the unauthorized distribution of a payload material in accordance with the present disclosure.

As shown in FIG. 2, an example flow diagram for operating a control mechanism in accordance with the present disclosure is illustrated. As show in FIG. 2, one or more signals representing a position of a transport assembly with respect to a storage receptacle is received from one or more location-determining devices (Block 202). For example, the electronic device 116 is configured to receive one or more signals representing locations of the transport assembly 102 and one or more storage receptacles 112 from respective location-determining devices 114 via the communication network 122.

A determination is made of whether the transport assembly is correctly positioned with respect to the storage receptacle (Decision Block 204). As described above, the control module 128 is configured to determine whether the location-determining device 114A is correctly positioned with respect to a storage receptacle 112. If the transport assembly is not properly positioned (NO from Decision Block 204), the lockbox arm 106D remains in the first position to prevent the operator from offloading (e.g., dispersing) the granular material. If the transport assembly is properly positioned (YES from Decision Block 204), a signal is transmitted to a control mechanism to cause a lockbox arm to transition from a first position to a second position (Block 206). As described above, the control module 128 is configured to cause transmission of a signal to the control mechanism 124. In response, the control mechanism 124 causes the lockbox arm 106D to transition from the first position to the second position to allow the operator to engage the crank 106B to disperse the payload material (e.g., granular material) from the corresponding receptacle 104. In an implementation, the payload release assembly 106 includes an illumination apparatus 130 (e.g., a light) that is configured to illuminate when the lockbox arm 106D transitions from the first position to the second position to indicate to the operator that the granular material can be dispersed. Additionally, the control mechanism 124 is configured to operate the PTO valve 126 as described above.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. In a transportation system which includes a transport vehicle having a plurality of storage compartments for storing one or more types of granular material and a delivery system for transferring granular material from the transport vehicle to at least a first storage receptacle and a second storage receptacle, a system for controlling the transfer of granular material, wherein the system comprises:

a location-determining device coupled to the transport vehicle, the location-determining device configured to determine a position of the transport vehicle;

a plurality of location-determining devices coupled to the first storage receptacle and the second storage receptacle, the location-determining devices configured to determine the positions of the first storage receptacle and the second storage receptacle;

a dispersal control mechanism configured to control dispersal of the granular material from the transport vehicle to the first storage receptacle and the second storage receptacle;

a dispersal control memory; wherein the dispersal control memory is configured to store a plurality of transport vehicle data; wherein the transport vehicle data comprises:

information regarding the type of granular material stored in at least a first storage compartment and a second storage compartment of the transport vehicle; and location data regarding at least the first storage receptacle and the second storage receptacle;

wherein the dispersal control mechanism is communicatively coupled to the location-determining devices and the dispersal control memory; wherein the dispersal control mechanism is configured to cause the delivery system to allow dispersal of at least a portion of the granular material from the first storage compartment to the first storage receptacle based at least in part on data comprising: the location of the transport vehicle, the location of the first storage receptacle, the type of granular material stored in the first storage compartment, and the type of granular material stored in the first storage receptacle;

further wherein the dispersal control mechanism is configured to cause the control mechanism to allow dispersal of at least a portion of the granular material from at least the second storage compartment to the second storage receptacle based at least in part on data comprising: the location of the transport vehicle, the location of the second storage receptacle, the type of granular material stored in the second storage compartment, and the type of granular material stored in the second storage receptacle; and a lockbox arm functionally connected to the first storage compartment, the lockbox arm configured to prevent the unauthorized rotation of a crank pivotally connected to the first storage compartment, wherein the crank is configured to transition between a first position restricting the dispersal of granular materials from the first storage compartment and a second position allowing at least partial distribution of the granular materials from the first storage compartment;

wherein the lockbox arm is operatively coupled to the dispersal control mechanism, wherein the dispersal control mechanism is configured to transition the lockbox arm from the first position to the second position based at least in part on data comprising: the location of the transport vehicle, the location of the first storage receptacle, the type of granular material stored in the first storage compartment, and the type of granular material stored in the first storage receptacle.

* * * * *